US011112597B2

(12) United States Patent
Vezain et al.

(10) Patent No.: US 11,112,597 B2
(45) Date of Patent: Sep. 7, 2021

(54) DUAL-DRIVE DEVICE FOR SEQUENTIAL SCANNING, AND ASSOCIATED METHOD

(71) Applicant: THALES, Courbevoie (FR)

(72) Inventors: Stéphane Vezain, Mandelieu (FR); Damien Chassoulier, Mouans-Sartoux (FR); Didier Stanek, Cannes la Bocca (FR); Nicola Guercio, Le Cannet (FR)

(73) Assignee: THALES, Courbevoie (FR)

( * ) Notice: Subject to any disclaimer, the term of this patent is extended or adjusted under 35 U.S.C. 154(b) by 222 days.

(21) Appl. No.: 16/159,425

(22) Filed: Oct. 12, 2018

(65) Prior Publication Data
US 2019/0113740 A1 Apr. 18, 2019

(30) Foreign Application Priority Data

Oct. 16, 2017 (FR) ...................... 1701073

(51) Int. Cl.
G02B 26/10 (2006.01)
G02B 7/182 (2021.01)
H02K 16/02 (2006.01)
H02K 37/00 (2006.01)
H02K 17/34 (2006.01)
G02B 26/08 (2006.01)

(52) U.S. Cl.
CPC ......... *G02B 26/105* (2013.01); *G02B 7/1821* (2013.01); *G02B 26/0858* (2013.01); *H02K 16/025* (2013.01); *H02K 17/34* (2013.01); *H02K 37/00* (2013.01)

(58) Field of Classification Search
None
See application file for complete search history.

(56) References Cited

U.S. PATENT DOCUMENTS

| 4,186,991 A * | 2/1980 | Koide | G03B 27/526 348/203 |
| 4,233,503 A * | 11/1980 | Saito | G02B 7/305 250/204 |
| 4,439,003 A * | 3/1984 | Roth | G02B 26/10 248/123.2 |
| 5,277,076 A | 1/1994 | Ostaszewski | |

(Continued)

FOREIGN PATENT DOCUMENTS

WO  2013/106701 A1  7/2013

*Primary Examiner* — Christopher Stanford
*Assistant Examiner* — Journey F Sumlar
(74) *Attorney, Agent, or Firm* — BakerHostetler

(57) ABSTRACT

A dual-drive device for sequential scanning includes a moving part comprising a frame and an optical instrument that is positioned on the frame and is rotatable about a first axis with respect to the frame so as to be slowed down or immobilized in a plurality of successive positions about the first axis, a motor configured to set the moving part in rotation about the first axis in a first direction of rotation at a constant speed, the moving part comprising a first actuator positioned on the frame and configured to actuate the rotation of the optical instrument about the first axis with respect to the frame in the first direction of rotation in order to pass from a first position to a successive position from the plurality of successive positions, and in a second direction of rotation, opposite to the first direction of rotation, in order to slow down or immobilize the optical instrument in the successive position.

11 Claims, 5 Drawing Sheets

(56) References Cited

U.S. PATENT DOCUMENTS

| | | | | |
|---|---|---|---|---|
| 6,124,961 | A * | 9/2000 | Tsuda | G03B 37/00 |
| | | | | 356/510 |
| 2007/0291382 | A1 * | 12/2007 | Pinard | G02B 26/105 |
| | | | | 359/871 |
| 2010/0118362 | A1 * | 5/2010 | Lee | G02B 26/101 |
| | | | | 359/198.1 |
| 2012/0133249 | A1 * | 5/2012 | Konkola | H02K 16/025 |
| | | | | 310/68 B |
| 2013/0088567 | A1 | 4/2013 | Fitzpatrick et al. | |
| 2014/0340474 | A1 | 11/2014 | Fields et al. | |
| 2015/0168713 | A1 * | 6/2015 | Nowatzyk | A61B 3/1025 |
| | | | | 359/201.2 |
| 2016/0332363 | A1 * | 11/2016 | Moore | G02B 26/101 |

* cited by examiner

DUAL-DRIVE DEVICE FOR SEQUENTIAL SCANNING, AND ASSOCIATED METHOD

CROSS-REFERENCE TO RELATED APPLICATIONS

This application claims priority to foreign French patent application No. FR 1701073, filed on Oct. 16, 2017, the disclosure of which is incorporated by reference in its entirety.

FIELD OF THE INVENTION

The invention relates to a dual-drive device for sequential scanning and to a dual-drive method for sequential scanning. The invention can apply to the field of space but also finds application in other different fields such as the observation or the positioning of any instrument with respect to another. An application of the invention in space will be used here by way of example.

BACKGROUND

During some space missions, it is necessary to be able to rapidly confer precise successive positions on an optical instrument, for example a mirror. This is the case in particular for rotary scanning mechanisms, which need to be held in successive given positions. For example, a mirror may be required to take up 49 successive positions that are spaced apart by 0.69°, with a time interval of 15 to 20 ms between each position. The mirror then has to reach a calibration position, in which it is paused for a particular time, for example 200 ms, and then it has to return to the initial position of the cycle of rotary scans. The total duration of the cycle and the pause times for calibration and image capturing are set by specifications that are predefined depending on the mission.

Currently, the successive positions of rotary scanning mechanisms are obtained by the generation of a torque by a motor controlled by a precise optical coder in order to reach each step.

The system has to be under closed-loop control in order to meet the need for precision. The drawback is that, at each step, strong acceleration is necessary and creates torques that are transferred to the platform. These torques can cause the optical instrument to vibrate, and thus degrade the precision of image capturing, skew the satellite and also have a negative effect on any other on-board instruments. In order to eliminate all or some of the transferred torques, it is known to add to the mechanism that carries out the main function a mechanism referred to as a compensation mechanism, which has the same inertia and the same motor and which will be controlled with the opposite torque. In this way, with the torques adding up, the platform is not stressed by vibrations (only the residual between the torque generated by the functional mechanism and that generated by the compensation mechanism). The compensation mechanism has approximately the same mass and the same dimensions as the functional mechanism, thereby doubling the mass and dimensions.

SUMMARY OF THE INVENTION

The invention aims to remedy all or some of the above-mentioned problems by proposing a device that decouples the function of continuous rotation and the pause function by virtue of a motor which drives the mirror in rotation at a constant speed and an actuator which brakes and slows down the mirror during the rotary scan cycle. This solution makes it possible to obtain stable positions of the optical instrument without requiring a compensation mechanism.

To this end, the subject of the invention is a dual-drive device for sequential scanning, comprising:

a moving part comprising a frame and an optical instrument that is positioned on the frame and is rotatable about a first axis with respect to the frame so as to be immobilized in a plurality of successive positions about the first axis, a motor configured to set the moving part in rotation about the first axis in a first direction of rotation at a constant speed, the moving part comprises a first actuator positioned on the frame and configured to actuate the rotation of the optical instrument about the first axis with respect to the frame in the first direction of rotation in order to pass from a first position to a successive position from the plurality of successive positions, and in a second direction of rotation, opposite to the first direction of rotation, in order to slow down or immobilize the optical instrument in the successive position.

Advantageously, the moving part also comprises a counter-inertia device that is rotatable about the first axis with respect to the frame, a second actuator positioned on the frame and configured to actuate the rotation of the counter-inertia device about the first axis with respect to the frame in the first direction of rotation or second direction of rotation, conversely to the direction of rotation of the optical instrument.

Advantageously, the first actuator and the second actuator are aligned.

Advantageously, the first actuator and the second actuator are identical.

Advantageously, the first actuator and the second actuator are piezoelectric actuators.

According to another embodiment, the moving part also comprises a counter-inertia device that is rotatable about the first axis with respect to the frame, and the first actuator is configured to actuate the rotation of the counter-inertia device about the first axis with respect to the frame in the first direction of rotation or second direction of rotation, conversely to the direction of rotation of the optical instrument.

Advantageously, the first actuator comprises a first end and a second end, the first end being connected to the counter-inertia device and the second end being connected to the optical instrument, and the first actuator comprises a central mechanical interface secured to the frame, such that the first end drives the counter-inertia device in rotation about the first axis with respect to the frame in a direction opposite to the direction of rotation of the optical instrument.

The invention also relates to a piece of space equipment comprising such a dual-drive device for sequential scanning.

The invention also relates to a dual-drive method for sequential scanning by a device comprising a moving part comprising a frame and an optical instrument that is positioned on the frame and is rotatable about a first axis with respect to the frame so as to be slowed down or immobilized in a plurality of successive positions about the first axis, a motor, the moving part comprising a first actuator, the method comprising the following steps:

setting the moving part in rotation at a constant speed about the first axis in a first direction of rotation by way of the motor, actuating, by way of the first actuator, the rotation of the optical instrument about the first axis with respect to the frame in a second direction of rotation, opposite to the first direction of rotation, so as to slow down or immobilize the optical instrument in a first position from among the plurality of successive positions.

According to one embodiment, the method according to the invention also comprises a step of actuating, by way of the first actuator, the rotation of the optical instrument about the first axis with respect to the frame in the first direction of rotation in order to pass from a first position to a successive position from the plurality of successive positions.

Advantageously, the method comprises, after the step of actuating, by way of the first actuator, the rotation of the optical instrument about the first axis with respect to the frame in the first direction of rotation in order to pass from a first position to a successive position from the plurality of successive positions, the step of actuating, by way of the first actuator, the rotation of the optical instrument about the first axis with respect to the frame in a second direction of rotation, opposite to the first direction of rotation, so as to slow down or immobilize the optical instrument in a position from among the plurality of successive positions.

BRIEF DESCRIPTION OF THE DRAWINGS

The invention will be understood better and further advantages will become apparent from reading the detailed description of an embodiment given by way of example, said description being illustrated by the appended drawing, in which.

For the sake of clarity, the same elements will bear the same reference signs in the different figures.

DETAILED DESCRIPTION

In the description of the present application, the invention is described in the context of an application in space. As mentioned above, the invention can apply to any other technical field that requires the employment of a dual-drive device for sequential scanning by any instrument.

Figure 1:
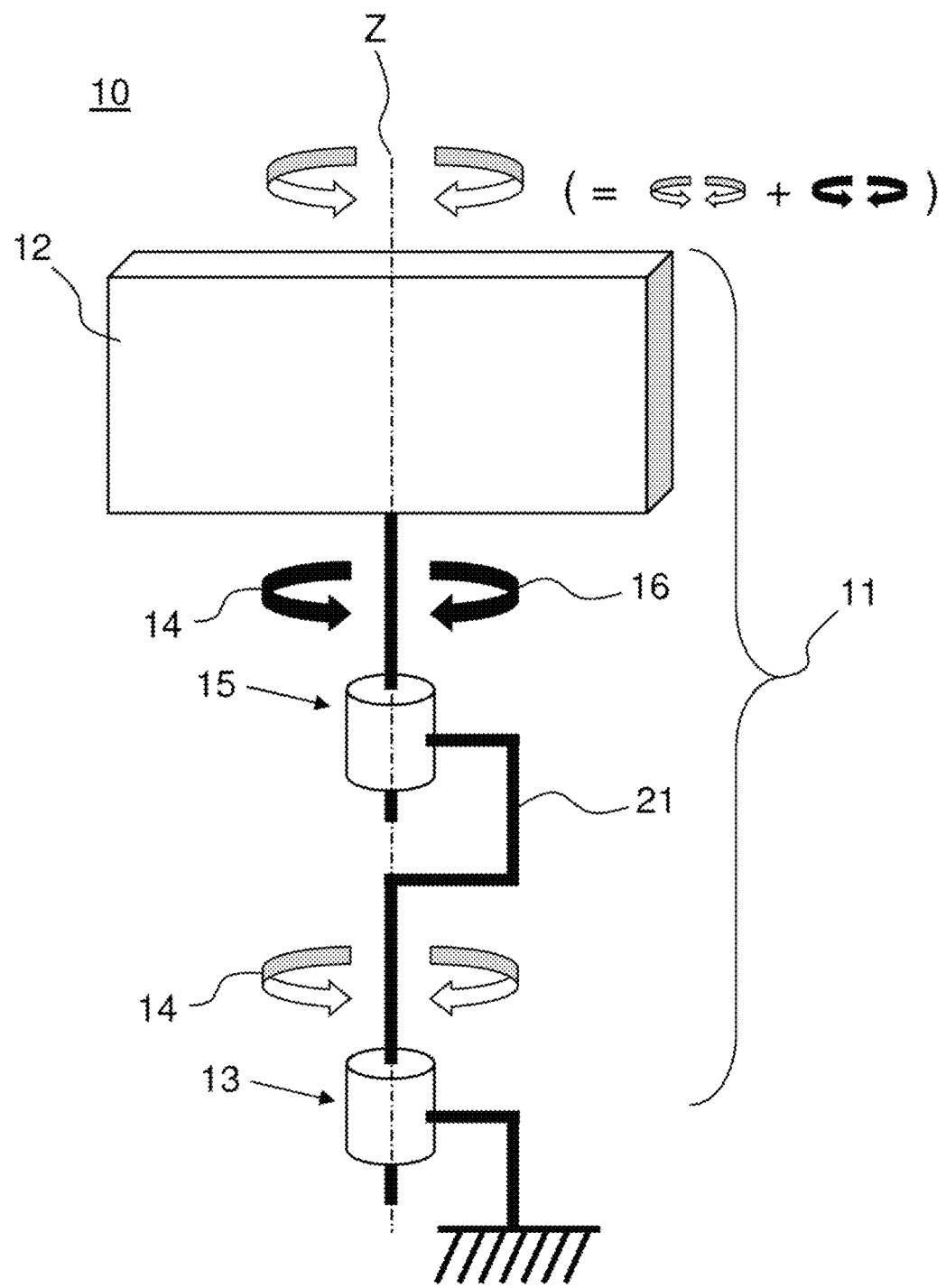
FIG. 1 schematically shows the principle of the dual-drive device for sequential scanning according to the invention, FIG. 2A schematically shows a first embodiment of a dual-drive device according to the invention.

FIG. 1 schematically shows the principle of the dual-drive device 10 for sequential scanning according to the invention. The device 10 comprises a moving part 11 comprising a frame 21 and an optical instrument 12 that is positioned on the frame 21 and is rotatable about a first axis Z with respect to the frame 21 so as to be immobilized in a plurality of successive positions about the first axis Z. The device 10 comprises a motor 13 configured to set the moving part 11 in rotation about the first axis Z in a first direction of rotation 14 at a constant speed. According to the invention, the moving part 11 comprises a first actuator 15 connected to the frame 21 and configured to actuate the rotation of the optical instrument 12 about the first axis Z in the first direction of rotation 14 in order to pass from a first position to a successive position from the plurality of successive positions, and in a second direction of rotation 16, opposite to the first direction of rotation 14, so as to immobilize or slow down the optical instrument 12 in the successive position.

The motor 13 drives the moving part 11 in rotation about the first axis Z at a constant speed. The moving part 11 scans the total path necessary for all the image captures. The first actuator 15 is mounted in series on the moving part 11. The first actuator 15 successively accelerates and decelerates as many times as there are image captures to be made during the rotation of the moving part 11 about the first axis Z at a constant speed. This results in a successive stopping or reduction in speed of the mirror with respect to an absolute frame of reference. The first actuator 15 actuates the optical instrument 12 in a direction of rotation which depends on the current phase of the cycle. When the optical instrument passes from one position to the successive position of the cycle, the first actuator 15 actuates the optical instrument 12 in the first direction of rotation 14, which is identical to the direction of rotation of the moving part at a constant speed about the first axis Z. In other words, the first actuator 15 contributes towards the movement of the optical instrument 12 in the first direction of rotation 14. When the optical instrument 12 has to be immobilized in one position of the cycle, the first actuator 15 actuates the optical instrument 12 in the second direction of rotation 16, which is opposite to the first direction of rotation 14. In other words, the first actuator 15 counters the movement of the optical instrument 12 in the first direction of rotation 14 in order to achieve the immobilization or slowing down of the optical instrument 12 in the desired position of the cycle. This succession of operations of setting in rotation in the first or the second direction of rotation by the first actuator 15 can be carried out as many times as there are successive positions in the cycle.

Typically, and in traditional orders of magnitude, in order to realize the rotation of the optical instrument, the first actuator 15 has to exert a maximum torque of less than 10 Nm, i.e. a maximum force of 100 N on a lever arm of 10 cm.

Figure 2A:
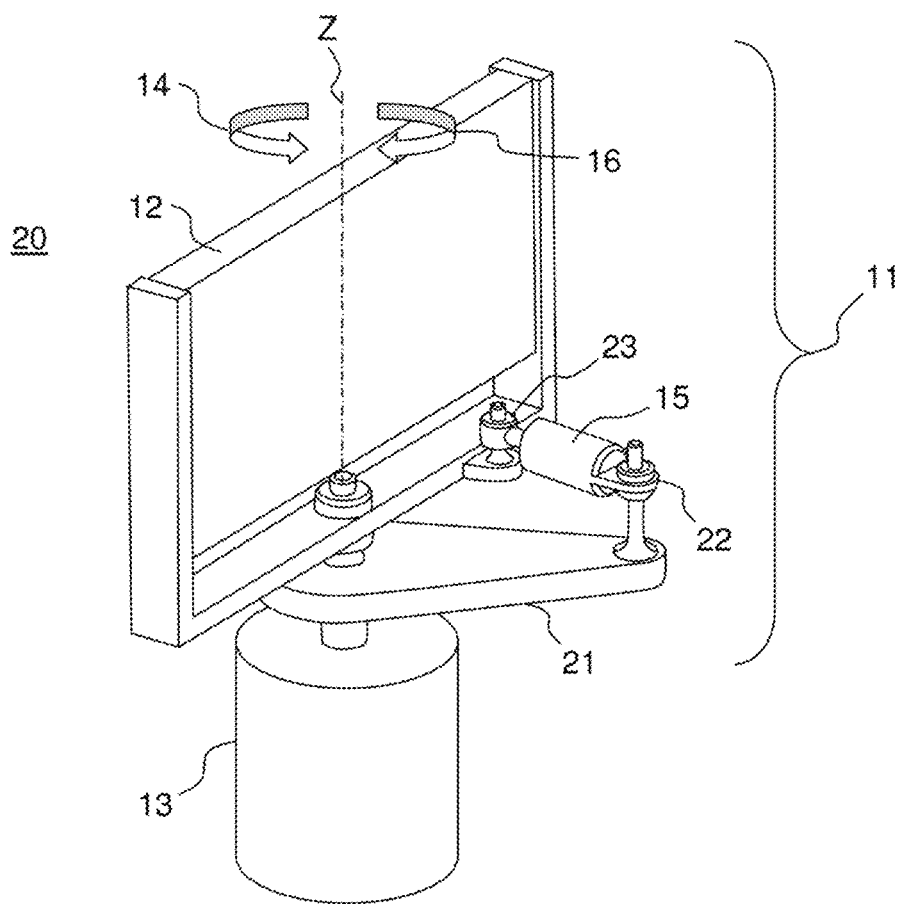
FIG. 2B is a top view of the device depicted in FIG. 2A, FIG. 3A schematically shows another embodiment of a dual-drive device according to the invention.

FIG. 2A schematically shows a first embodiment of a dual-drive device 20 according to the invention. As explained above, the device 20 comprises a moving part 11 comprising a frame 21 and an optical instrument 12 that is positioned on the frame 21 and is rotatable about the first axis Z with respect to the frame 21 so as to be immobilized in a plurality of successive positions about the first axis Z. The device 20 comprises a motor 13 configured to set the moving part 11 in rotation about the first axis Z in a first direction of rotation 14 at a constant speed. According to the invention, the moving part 11 comprises a first actuator 15 positioned on the frame 21 and configured to actuate the rotation of the optical instrument 12 about the first axis Z with respect to the frame 21 in a first direction of rotation 14 in order to pass from a first position to a successive position from the plurality of successive positions, and in a second direction of rotation 16, opposite to the first direction of rotation 14, so as to immobilize the optical instrument 12 in the successive position.

In the embodiment depicted in FIG. 2A, the moving part 11 comprises a frame 21 on which the optical instrument 12 and the first actuator 15 are positioned. The frame 21 can be a plate or have some other form, which is not necessarily flat. The moving part 11 is thus set in rotation about the first axis Z by rotation of the frame 21 about the first axis Z. The frame 21 is set in rotation by the motor 13. The optical instrument 12 is rotatable about the first axis Z with respect to the frame 21. In other words, the optical instrument 12 has a degree of rotational freedom about the first axis Z with respect to the frame 21. A first part 22 of the first actuator 15 is secured to the frame 21 and a second part 23 of the first actuator 15 is connected to the optical instrument 12.

Figure 2B:
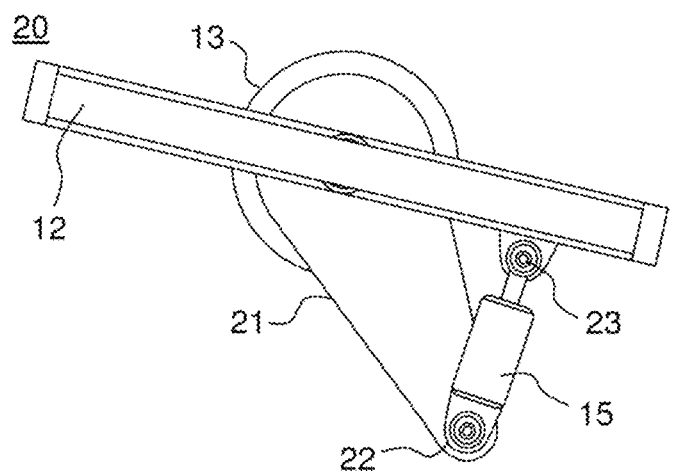

FIG. 2B is a top view of the device 20 depicted in FIG. 2A. With the first part 22 of the first actuator 15 being secured to the frame 21 and the second part 23 of the first actuator 15 being connected to the optical instrument 12, the first actuator 15 can set the optical instrument 12 in rotation with respect to the frame 21.

When the first actuator 15 is a piezoelectric actuator, the first actuator 15 will extend or retract. In the example shown, by extending, the first actuator 15 will move the optical instrument 12 in the first direction of rotation 14 and by retracting, the first actuator 15 will move the optical instrument 12 in the second direction of rotation 16. In other words, the rotation of the frame 21 has a movement in translation of the first actuator 15 added to it, which makes it possible to control the position of the optical instrument 12, that is to say either the actuation of the rotation of the optical instrument 12 about the first axis Z with respect to the frame 21 in the first direction of rotation 14 in order to pass from a first position to a successive position from the plurality of successive positions, or in a second direction of rotation 16, opposite to the first direction of rotation 14, so as to immobilize the optical instrument 12 in the successive position or to slow it down. In the embodiment shown in FIGS. 2A and 2B, the movement in translation takes place in a plane substantially perpendicular to the first axis Z. Piezoelectric actuators are well suited to implementing the invention, but other actuators, for example of the magnetic type or some other type known to a person skilled in the art, are also conceivable.

Figure 3A:
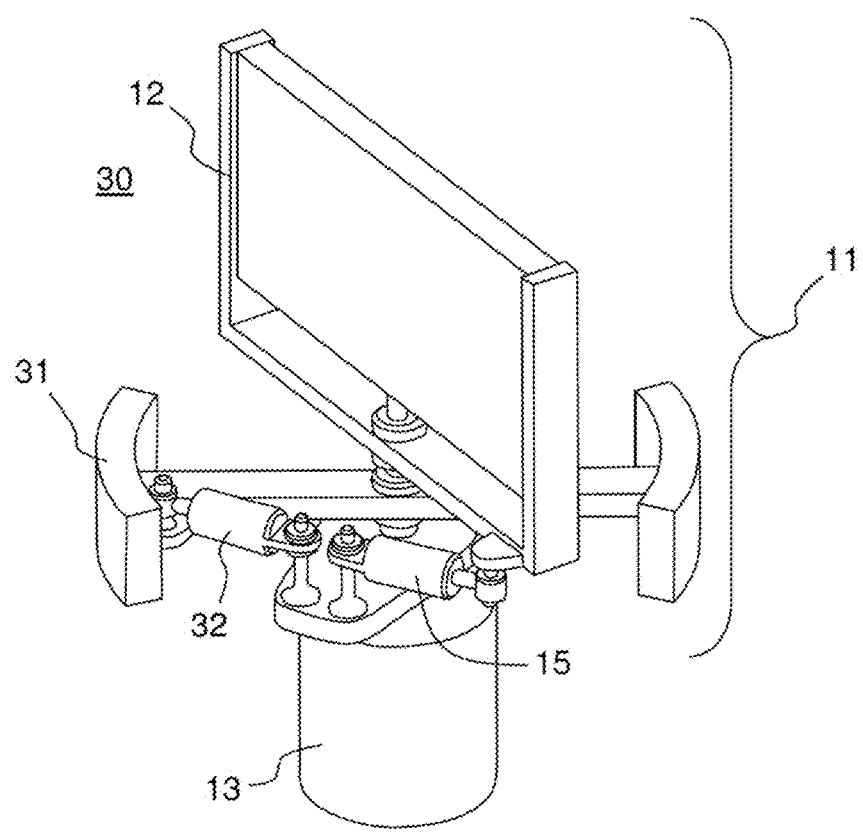
FIG. 3B is a top view of the device depicted in FIG. 3A, FIG. 4A schematically shows another embodiment of a dual-drive device according to the invention.

FIG. 3A schematically shows another embodiment of a dual-drive device 30 according to the invention. The device 30 shown in FIG. 3A is identical to the device 20 shown in FIG. 2A. The moving part 11 of the device 30 also comprises a counter-inertia device 31 that is rotatable about the first axis Z with respect to the frame 21, and a second actuator 32 configured to actuate the rotation of the counter-inertia device 13 about the first axis Z with respect to the frame 21 in the first direction of rotation 14 or second direction of rotation 16, conversely to the direction of rotation of the optical instrument 12.

The actuation of the counter-inertia device 31 in the opposite direction to the direction of rotation of the optical instrument 12 makes it possible to cancel out the transmitted torques associated with the acceleration of the optical instrument 12 when it moves from one position to another successive position.

Figure 3B:
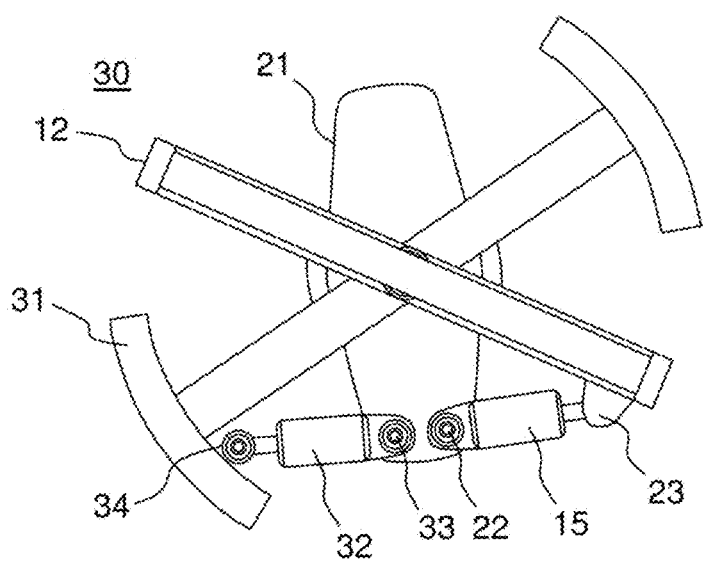

FIG. 3B is a top view of the device depicted in FIG. 3A. In this embodiment, the first actuator 15 and the second actuator 32 are aligned in the tangential direction, making it possible to cancel out the transmitted forces. A first part 33 of the second actuator 32 is secured to the frame 21 and a second part 34 of the second actuator 32 is connected to the counter-inertia device 31.

In order to control the first and second actuators 15, 32, it is thus sufficient to apply the same settings with opposite signs. When the first actuator 15 extends in order to move the optical instrument 12 in the first direction of rotation 14, the second actuator 32 extends with an extension in the opposite direction to the extension of the first actuator 15, in order to move the counter-inertia device 31 in the second direction of rotation 16.

It may be noted that the two actuators 15, 32 are not necessarily identical. The invention also applies to two different actuators. In this case, the control of the two actuators would be different.

Similarly, the two actuators are not necessarily aligned. When the first and the second actuator 15, 32 are not aligned, it is preferable to have a third actuator for cancelling out the radial component of the transmitted force.

Figure 4A:
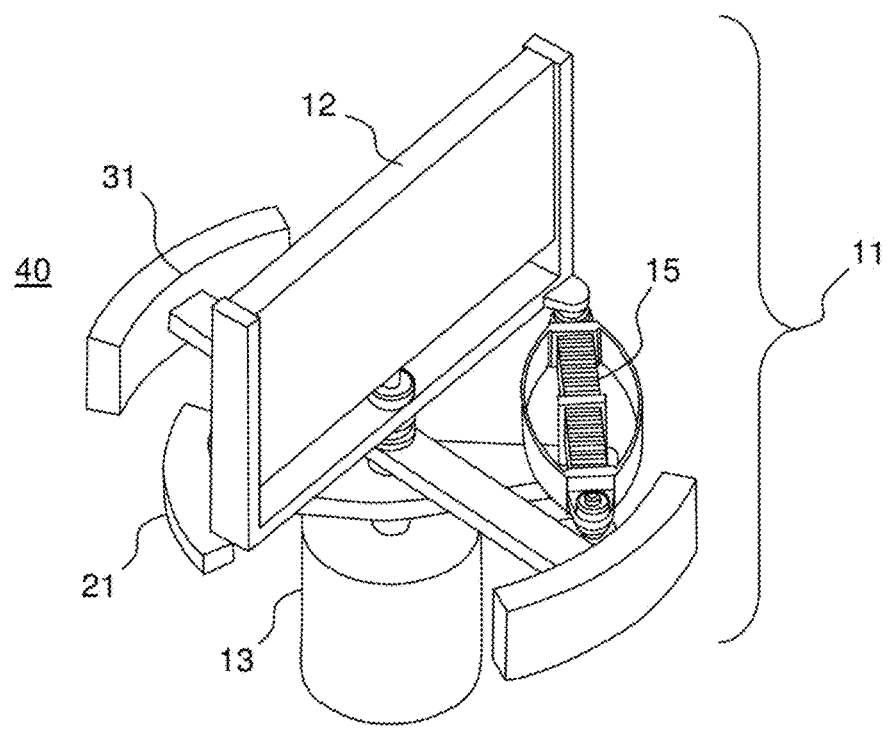
FIG. 4B is a top view of the device depicted in FIG. 4A, FIG. 5 schematically shows a piece of space equipment comprising a device according to the invention.

FIG. 4A schematically shows another embodiment of a dual-drive device 40 according to the invention. The device 40 shown in FIG. 4A is identical to the device 30 shown in FIG. 3A but comprises only one actuator (the first actuator 15). In this embodiment, the first actuator 15 is configured to actuate the rotation of the counter-inertia device 31 about the first axis Z with respect to the frame 21 in the first direction of rotation 14 or second direction of rotation 16, conversely to the direction of rotation of the optical instrument 12. This configuration makes it possible to have only one actuator for moving two elements symmetrically and conversely.

Figure 4B:
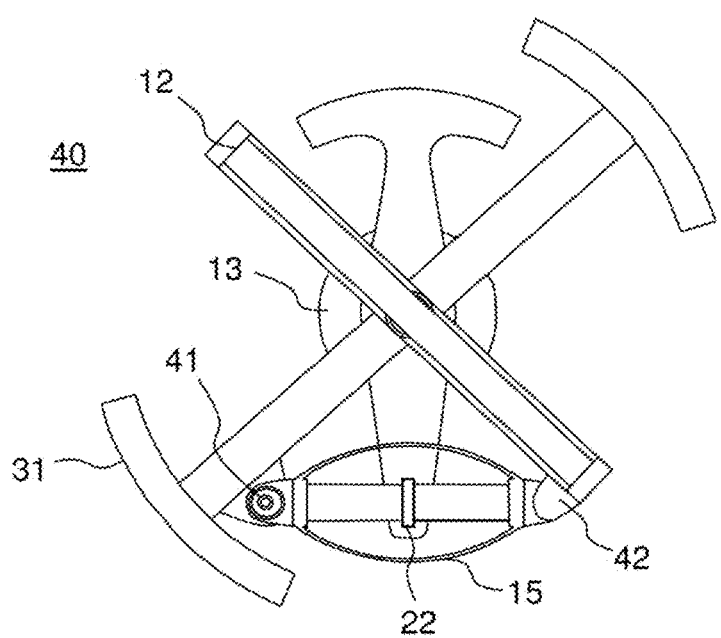

FIG. 4B is a top view of the device depicted in FIG. 4A. The first actuator 15 comprises a first end 41 and a second end 42, the first end 41 being connected to the counter-inertia device 31 and the second end 42 being the second part 23 connected to the optical instrument 12, and the first actuator 15 comprises a central mechanical interface secured to the frame 21 such that the first end 41 drives the counter-inertia device 31 in rotation about the first axis Z in a direction opposite to the direction of rotation of the optical instrument 12.

In other words, compared with the device 30 in FIG. 3B, the first end 41 corresponds to the second part 34 of the second actuator 32, which is connected to the counter-inertia device 31. The second end 42 corresponds to the second part 23 of the first actuator 15, which is connected to the optical instrument 12. In addition, the first part 22 is secured to the frame 21, corresponding to the two parts 22 and 33 of the first and second actuators 15, 32. Thus, such an actuator 15 is divided in two and has a central mechanical interface and two lateral mechanical interfaces for equal and opposite dual actuation.

Figure 5:
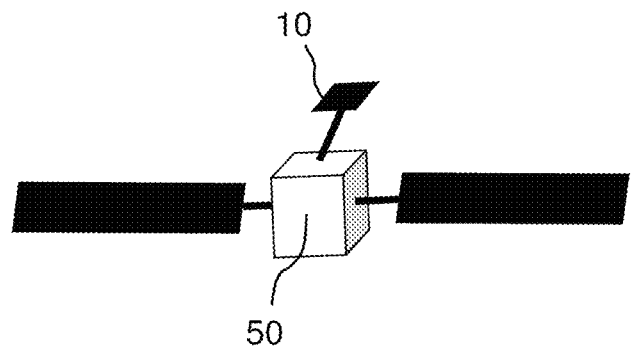

FIG. 5 schematically shows a piece of space equipment 50 comprising a device 10 according to the invention. The piece of space equipment can comprise other embodiments of the device according to the invention, such as the embodiments set out above with respect to FIGS. 2A, 3A and 4A.

Figure 6:
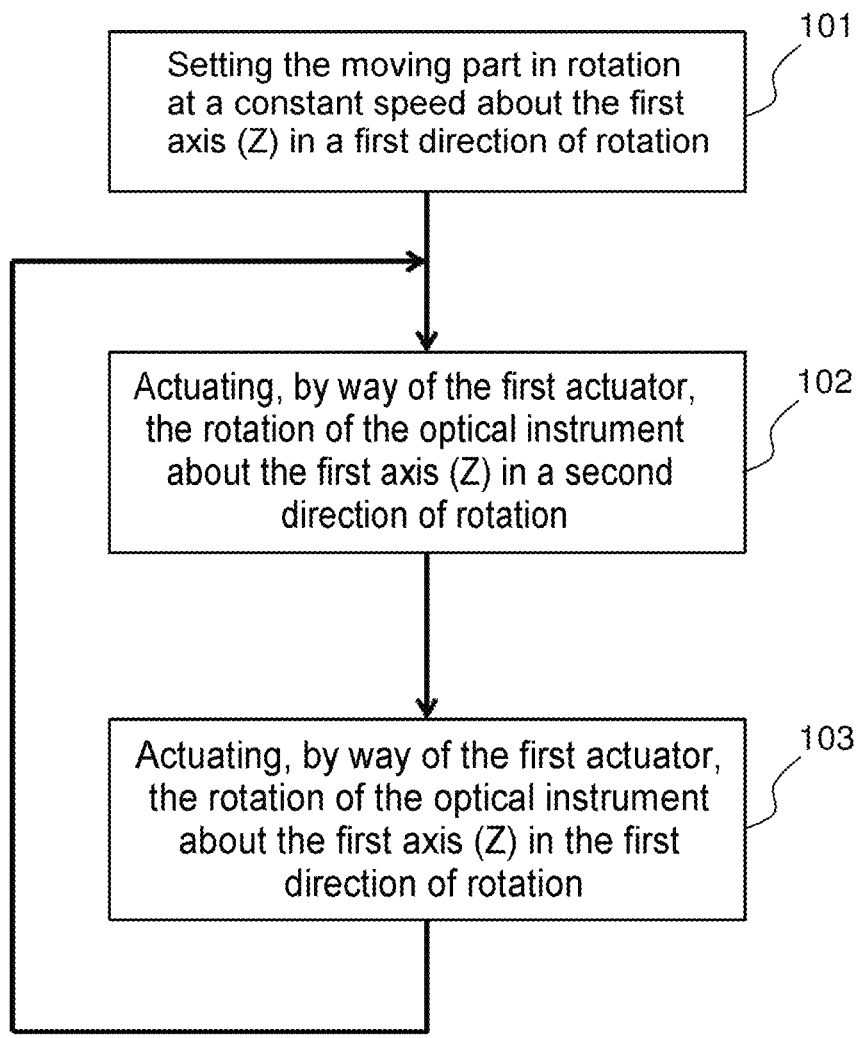
FIG. 6 shows the steps of a method for sequential scanning according to the invention.

FIG. 6 shows the steps in a sequential scanning method according to the invention. The dual-drive method for sequential scanning by a device comprising a moving part 11, the moving part comprising a frame 21 and an optical instrument 12 that is positioned on the frame 21 and is rotatable about a first axis Z with respect to the frame 21 so as to be slowed down or immobilized in a plurality of successive positions about the first axis Z, a first actuator 15, and a motor 13, comprises a step 101 of setting the moving part 11 in rotation at a constant speed about the first axis Z in a first direction of rotation 14 by way of the motor 13, and a step 102 of actuating, by way of the first actuator 15, the rotation of the optical instrument 12 about the first axis Z with respect to the frame 21 in a second direction of rotation 16, opposite to the first direction of rotation 14, by the first end 41 being moved in translation with respect to the second end 42, so as to slow down or immobilize the optical instrument 12 in a first position from among the plurality of successive positions.

According to one embodiment of the method according to the invention, the method can also comprise a step 103 of actuating, by way of the first actuator 15, the rotation of the optical instrument 12 about the first axis Z with respect to the frame 21 in the first direction of rotation 14 in order to pass from a first position to a successive position from the plurality of successive positions.

The invention claimed is:

1. A dual-drive device for sequential scanning, comprising:
   a moving part comprising a frame and an optical instrument that is positioned on the frame and is rotatable about a first axis with respect to the frame so as to be immobilized in a plurality of successive positions about the first axis,
   a motor configured to set the moving part in rotation about the first axis in a first direction of rotation at a constant speed,
   wherein the moving part comprises a first actuator positioned on the frame mounted in series on the moving part, said first actuator comprising a first end and a second end, the first end being secured to the frame and the second end being connected to the optical instrument, said first actuator being configured to move the first end in translation relative to the second end in a plane substantially perpendicular to the first axis so as to actuate the rotation of the optical instrument about the first axis with respect to the frame in the first direction of rotation in order to pass from a first position to a successive position from the plurality of successive positions, and in a second direction of rotation, opposite to the first direction of rotation, in order to slow down or immobilize the optical instrument in the successive position.

2. The device according to claim 1, wherein the moving part also comprises:
   a counter-inertia device that is rotatable about the first axis with respect to the frame,
   a second actuator positioned on the frame and configured to actuate the rotation of the counter-inertia device about the first axis with respect to the frame in the first direction of rotation or second direction of rotation, conversely to the direction of rotation of the optical instrument.

3. The device according to claim 2, wherein the first actuator and the second actuator are aligned.

4. The device according to claim 2, wherein the first actuator and the second actuator are identical.

5. The device according to claim 2, wherein the first actuator and the second actuator are piezoelectric actuators.

6. The device according to claim 1, wherein the moving part also comprises:
   a counter-inertia device that is rotatable about the first axis with respect to the frame,
   wherein the first actuator is configured to actuate the rotation of the counter-inertia device about the first axis with respect to the frame in the first direction of rotation or second direction of rotation, conversely to the direction of rotation of the optical instrument.

7. The device according to claim 6, wherein the first actuator comprises a first end and a second end, the first end being connected to the counter-inertia device and the second end being connected to the optical instrument, and in that the first actuator comprises a central mechanical interface secured to the frame, such that the first end drives the counter-inertia device in rotation about the first axis with respect to the frame in a direction opposite to the direction of rotation of the optical instrument.

8. A piece of space equipment comprising a device according to claim 1.

9. A dual-drive method for sequential scanning by a device comprising:
   a moving part comprising a frame and an optical instrument that is positioned on the frame and is rotatable about a first axis with respect to the frame so as to be slowed down or immobilized in a plurality of successive positions about the first axis,
   a motor,
   the moving part comprising a first actuator mounted in series on the moving part, said first actuator comprising a first end and a second end, the first end being secured to the frame and the second end being connected to the optical instrument,
   wherein the method comprises the following steps:
      setting the moving part in rotation at a constant speed about the first axis in a first direction of rotation by way of the motor,
      actuating, by way of the first actuator, the rotation of the optical instrument about the first axis with respect to the frame in a second direction of rotation, opposite to the first direction of rotation, by the first end being moved in translation with respect to the second end in a plane substantially perpendicular to the first axis, so as to slow down or immobilize the optical instrument in a first position from among the plurality of successive positions.

10. The method according to claim 9, further comprising a step of actuating, by way of the first actuator, the rotation of the optical instrument about the first axis with respect to the frame in the first direction of rotation in order to pass from a first position to a successive position from the plurality of successive positions.

11. The method according to claim 10, further comprising, after the step of actuating, by way of the first actuator, the rotation of the optical instrument about the first axis with respect to the frame in the first direction of rotation in order to pass from a first position to a successive position from the plurality of successive positions, the step of actuating, by way of the first actuator, the rotation of the optical instrument about the first axis with respect to the frame in a second direction of rotation, opposite to the first direction of rotation, so as to slow down or immobilize the optical instrument in a position from among the plurality of successive positions.

* * * * *